CADMIUM SUBSTITUTED LEAD ZIRCONATE TITANATE COMPOSITIONS
Filed Dec. 26, 1962
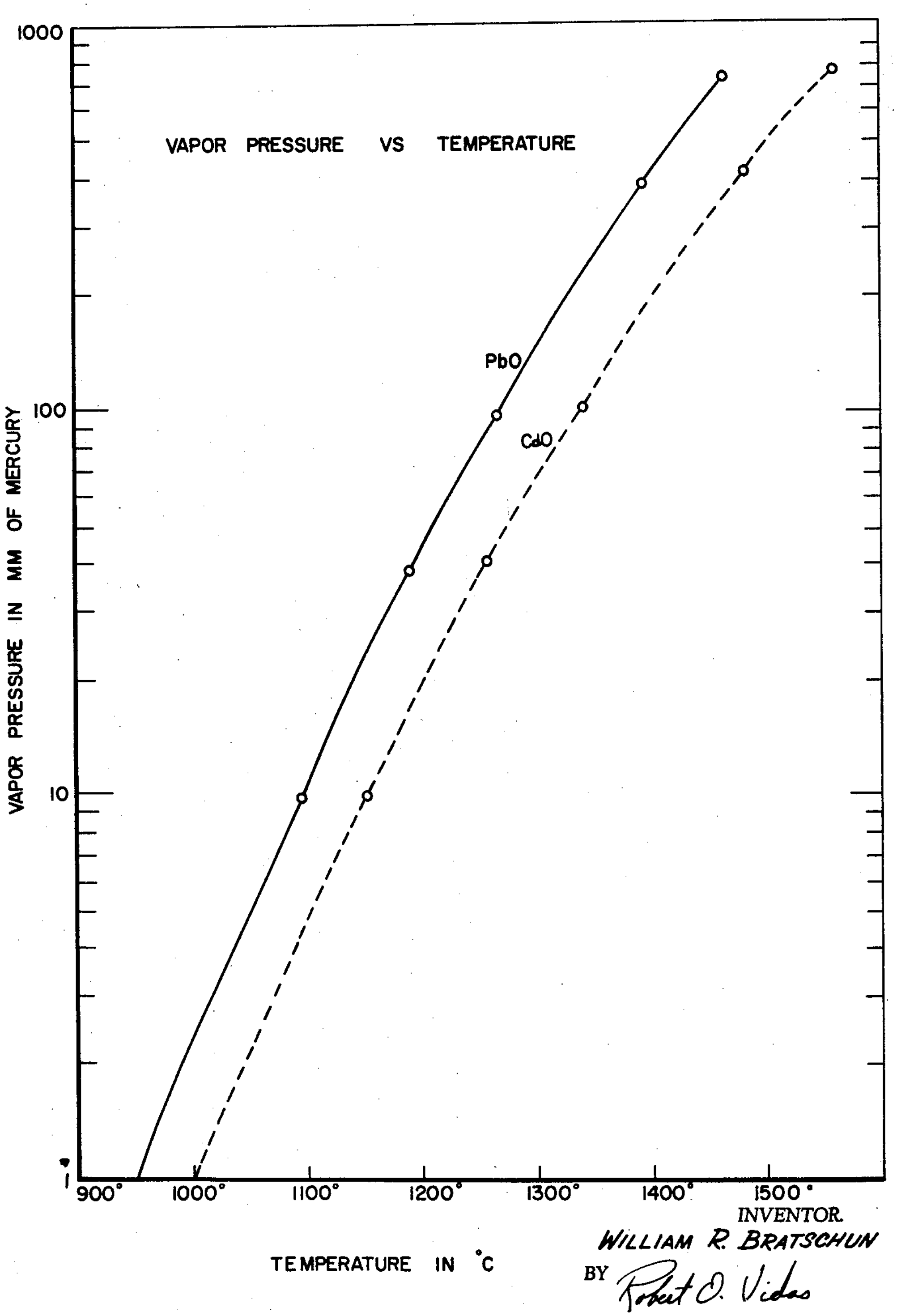
INVENTOR.
WILLIAM R. BRATSCHUN
BY Robert O. Vidas
ATTORNEY United States Patent Office 3,194,765
Patented July 13, 1965

3,194,765
CADMIUM SUBSTITUTED LEAD ZIRCONATE TITANATE COMPOSITIONS

William R. Bratschun, Hopkins, Minn., assignor to Honeywell Inc., a corporation of Delaware
Filed Dec. 26, 1962, Ser. No. 247,211
6 Claims. (Cl. 252—62.9)

The present invention relates to improved ferro-electric compositions and the method of making same. More particularly, the present invention is directed to lead zirconate-lead titanate based compositions having cadmium substituted for a portion of the lead.

Since the initial discoveries of Bernard Jaffe, reported in Journal of Research of the National Bureau of Standards, volume 55, No. 5, November 1955, that solid solutions of lead zirconate-lead titanate possess ferroelectric properties and may be polarized, numerous studies have been made in attempts to improve on and modify the characteristics of the lead zirconate-lead titanate compositions. For example, it has been proposed that certain percentages of the lead be replaced or substituted by calcium or strontium. By this substitution certain of the properties such as dielectric constant, radial coupling coefficient, and mechanical Q are improved over that of the pure lead zirconate-lead titanate.

I have discovered that through substitution of cadmium oxide for a portion of the lead oxide in lead zirconate-lead titanate based compositions, improvements in the various properties, including those previously enumerated in regard to strontium or calcium, are obtained over those of the pure lead zirconate-lead titanate systems. In addition to the improved ultimate product, my invention has the further advantage that it greatly reduces the necessary firing temperatures used in manufacture of the improved composition of my invention.

As a further advantage of the present invention's lowered firing temperature, I have discovered that antimony pentoxide may be used as an additive to lead zirconate-lead titanate compositions having a portion of the lead substituted by cadmium. The use of antimony pentoxide as an additive is somewhat analogous to the use of niobia, tantala and various rare earth oxides suggested in similar systems by previous investigators.

Accordingly, it is the object of the present invention to provide an improved ferroelectric composition of lead zirconate-lead titanate which has a portion of the lead substituted by cadmium.

It is a further object of the present invention to provide improved lead zirconate-lead titanate compositions which may be fired at greatly reduced temperatures.

It is still a further object of the present invention to provide lead zirconate-lead titanate compositions wherein a portion of the lead is substituted by cadmium and wherein a quantity of antimony pentoxide or oxides of the group consisting of niobium, tantalum, and rare earth elements are utilized as doping agents.

Other and further objects will be apparent from a study of the following specification and drawing.

The techniques utilized in the manufacture of cadmium substituted lead zirconate-lead titanate in accordance with the present invention are broadly the same techniques as have been utilized in the formation of prior art lead zirconate-lead titanate and lead zirconate-lead titanate based compositions. However, the firing temperatures necessary in forming the compositions of my invention are markedly lower than those taught in formulations of prior art lead zirconate-lead titanate and lead zirconate-lead titanate based compositions.

The present invention will improve the properties and lower the firing temperatures required in the manufacture of lead zirconate-lead titanate compositions over the entire range of compositions reported by Jaffe in the above referenced article (90:10 to 40:60 atomic ratio of Zr:Ti). As is well known, optmium compositions for highest radial coupling lie about 53:47 atomic ratio Zr:Ti. Consequently, the following discussion and data will be limited to these preferred compositions.

The following is illustrative of a procedure and of a composition in accordance with my invention. With changed compositions some slight change may be necessary in ultimate firing temperature and other procedures, although they will generally fall within the ranges which will be indicated below. A mixture of powdered lead oxide, zirconium oxide, titanium oxide, and cadmium oxide was prepared by ball milling (either in wet or dry condition) to produce a finely divided thoroughly mixed powder having an empirical formula:

$$Cd_{.015}Pb_{.985}Zr_{.53}Ti_{.47}O_3$$

This mixture (following drying) was calcined to pre-react the constituents at a temperature of 1100° F. for approximately 5 hours. The calcined material was reground and pressed to form slugs ½ inch thick and approximately one inch in diameter. Care must be exercised during the calcining operation and during ultimate firing to prevent or to balance loss of the volatile components—lead oxide and cadmium oxide—from the mixture. Techniques suitable for the prevention of such loss are well known to those skilled in the art and are described, for example, in a paper by S. Roberts appearing in the Journal of the American Ceramics Society 33(2), 63 (1950).

A slug of calcined material prepared as above was then ultimately fired at 1800° F. for 5 hours. Density of the finished product was 7.64 grams/cc. This is approximately 96% of theoretical density.

A slug prepared in the same manner as previously described, with the exception that the calcining reaction was at 1400° F. for 5 hours, had an ultimate density of 7.85 grams/cc., or 98% of theoretical density.

The importance of the ability to reach this degree of theoretical density at such relatively low temperatures will be discussed below when the compositions of the present invention are compared with those of prior compositions. The advantages of high density are, of course, obvious. High dielectric strength and other parameters desirable in ferroelectric materials are directly related to density.

The above example shows that compositions in accordance with the present invention may be prepared under atmosphere firing conditions. However, the use of hot pressing makes control of the variables of formulation somewhat simpler, and, therefore, a good deal of the following discussion will deal with hot pressed samples. However, through use of suitable techniques similar results may be obtained under ordinary atmosphere firing. Preparation of specimens using hot pressing techniques was the same as previously described above with the exception that the samples were maintained under a pressure of approximately 2000 p.s.i. during the ultimate firing step. As hot pressing is a well-known technique, it will not be further described herein.

Referring now to Table I, there is shown a series of compositions, pure lead zirconate-lead titanate, strontium substituted lead zirconate-lead titanate, niobia doped lead zirconate-lead titanate, and compositions in accordance with the present invention. All but one of these samples were prepared by hot pressing at 2000 p.s.i. and ultimate firing temperatures as indicated. Density as percent of theoretical is shown for the various compositions.

*Table I*

| Composition | Ultimate firing temperture, ° F. | Density (percent of theoretical) |
|---|---|---|
| $PbZr_{0.65}Ti_{0.35}O_3(1\%Nb_2O_5)$ | 2,250 | 99.5 |
| $PbZr_{0.65}Ti_{0.35}O_3(1\%Nb_2O_5)$ | 2,140 | 98.6 |
| $PbZr_{0.53}Ti_{0.47}O_3$ | 2,200 | 99.0 |
| $PbZr_{0.53}Ti_{0.47}O_3$ | 2,100 | 80.0 |
| $PbZr_{0.53}Ti_{0.47}O_3$ | 1,700 | 80.0 |
| $Sr_{0.05}Pb_{0.95}Zr_{0.53}Ti_{0.47}O_3$ | 2,300 | [1] 95.0 |
| $Sr_{0.05}Pb_{0.95}Zr_{0.53}Ti_{0.47}O_3$ | 1,700 | 53.7 |
| $Cd_{0.025}Pb_{0.975}Zr_{0.53}Ti_{0.47}O_3$ | 2,100 | 99.4 |
| $Cd_{0.025}Pb_{0.975}Zr_{0.53}Ti_{0.47}O_3$ | 2,000 | 99.6 |
| $Cd_{0.025}Pb_{0.975}Zr_{0.53}Ti_{0.47}O_3$ | 1,900 | 99.6 |
| $Cd_{0.025}Pb_{0.975}Zr_{0.53}Ti_{0.7}O_3$ | 1,800 | 99.2 |
| $Cd_{0.025}Pb_{0.075}Zr_{0.53}Ti_{0.47}O_3$ | 1,700 | 99.2 |
| $Cd_{0.025}Pb_{0.075}Zr_{0.53}Ti_{0.47}O_3$ | 1,600 | 99.2 |
| $Cd_{0.025}Pb_{0.075}Zr_{0.53}Ti_{0.47}O_3$ | 1,500 | 98.3 |

[1] Not hot pressed.

The table clearly shows that the compositions in accordance with the present invention may be fired at markedly lower temperatures than either the pure lead zirconate-lead titanate compositions or compositions in accordance with previous investigators wherein either strontium was utilized as a substitute for a portion of the lead or the composition was doped with a quantity of niobium oxide. Even at 1500° F. a high density product results, when utilizing my composition, that possesses a higher density than that of a comparable (although not hot pressed) strontium substitute lead zirconate-lead titanate composition fired at 2300° F. ultimate firing temperature. By comparison, a hot pressed strontium substituted lead zirconate-lead titanate sample fired at 1700° F. ultimate firing temperature showed only 53.7% of theoretical density.

The advantages of the lower permissible firing temperatures are obvious. In addition to the simpler and cheaper furnaces needed, there is also the advantage of reduced difficulty in quality control as the volatility of the constituents is markedly reduced. In FIGURE 1 there is shown a plot of vapor pressure in millimeters of mercury vs. temperature for lead oxide and cadmium oxide which are used in compositions of the present invention. As can be seen, the vapor pressure of lead oxide at 2200° F. (1205° C.) is 50 mm. of mercury while at 1800° F. (980° C.), the preferred firing temperature for compositions in accordance with my invention, the vapor pressure of lead oxide is approximately 1 mm. of mercury. Cadmium oxide vapor pressure, as is shown, is considerably lower than lead oxide at the same temperature. Thus, the hazards of the toxicity of these volatile materials and the need to take precautions against compositional changes due to volatilization is markedly reduced.

I have found also that the addition of small quantities of niobium oxide, tantalum oxide, and rare earth oxides to the lead zirconate-lead titanate having a portion of the lead substituted by cadmium in accordance with my invention will provide similar advantages to those taught in the Kulcsar Patent 2,911,370.

A further discovery which has been made commercially useful by the lower firing temperatures permitted by my invention is the use of antimony pentoxide as a doping agent in cadmium substituted lead zirconate-lead titanate compositions. The low firing temperatures of the present invention make possible the use of antimony pentoxide as a dopent in the same manner as the use of various dopents taught in the Kulcsar patent. Antimony pentoxide is a relatively volatile material and also is subject to decomposition at fairly low temperatures. While I have found some improvement of the various electrical properties of unmodified lead zirconate-lead titanate composition by inclusions of a small percentage of antimony pentoxide, the use of a cadmium substituted lead zirconate-lead titanate permits far simpler compounding procedures and quality control when using antimony pentoxide as a dopent in this type of composition. Through the use of antimony pentoxide or the dopents taught in the reference Kulcsar patent I have found that increased dielectric constant is found without a loss of the coupling coefficient of this material.

In Table II there is shown various piezoelectric data for compositions both in the prior art and compositions in accordance with the present invention. Conventional symbols have been used. As has been previously indicated, the data of this table has been limited to those samples which were actually hot pressed. This permitted far simpler control of the production of the test samples. However, similar results have been obtained through atmosphere firing techniques using controlled atmospheres to compensate for the tendency of the volatile constituents to be lost during firing.

*Table II*

| Composition | Calcining temperature, ° F. | ° F. firing temperature | Relative dielectric constant K, 24 hours after poling | $d_{33}$ m/v×$10^{-12}$ | kp | Density |
|---|---|---|---|---|---|---|
| $PbZr_{0.53}Ti_{0.47}O_3$ | ---------- | ---------- | 900 | 230 | 0.50 | 7.8 |
| $Sr_{0.05}Pb_{0.95}Zr_{0.53}Ti_{0.47}O_3$ | 1,600 | 2,300 | 1,200 | 280 | 0.52 | [1] 7.6 |
| $Cd_{0.005}Pb_{0.995}Zr_{0.53}Ti_{0.47}O_3$ | 1,100 | 2,100 | 1,090 | 248 | 0.57 | 7.86 |
| $Cd_{0.01}Pb_{0.99}Zr_{0.53}Ti_{0.47}O_3$ | 1,100 | 2,100 | 1,075 | 218 | 0.56 | 7.96 |
| $Cd_{0.015}Pb_{0.985}Zr_{0.53}Ti_{0.47}O_3$ | 1,500 | 2,200 | 1,087 | 300 | 0.48 | 7.86 |
| $Cd_{0.015}Pb_{0.985}Zr_{0.53}Ti_{0.47}O_3$ | 1,100 | 1,800 | 1,155 | 230 | 0.48 | [1] 7.66 |
| $Cd_{0.015}Pb_{0.985}Zr_{0.53}Ti_{0.47}O_3$ | 1,100 | 2,100 | 1,260 | 267 | 0.55 | 7.93 |
| $Cd_{0.015}Pb_{0.985}Zr_{0.53}Ti_{0.47}O_3$ | 1,250 | 1,800 | 1,170 | 256 | 0.49 | [1] 7.71 |
| $Cd_{0.025}Pb_{0.975}Zr_{0.53}Ti_{0.47}O_3$ | 1,500 | 2,200 | 1,043 | 265 | 0.42 | 7.91 |
| $Cd_{0.025}Pb_{0.975}Zr_{0.53}Ti_{0.47}O_3$ | 1,100 | 2,100 | 1,222 | 240 | 0.36 | 7.90 |
| $Cd_{0.025}Pb_{0.975}Zr_{0.54}Ti_{0.46}O_3$ | 1,100 | 2,100 | 1,202 | 283 | 0.51 | 7.87 |
| $Cd_{0.025}Pb_{0.975}Zr_{0.54}Ti_{0.46}O_3$ | 1,100 | 2,000 | 1,405 | 220 | 0.58 | 7.97 |
| $Cd_{0.025}Pb_{0.975}Zr_{0.54}Ti_{0.46}O_3$ | 1,100 | 1,900 | 1,290 | 210 | 0.56 | 7.97 |
| $Cd_{0.025}Pb_{0.975}Zr_{0.52}Ti_{0.48}O_3$ | 1,100 | 2,100 | 1,076 | 160 | -------- | 7.90 |
| $Cd_{0.035}Pb_{0.965}Zr_{0.53}Ti_{0.47}O_3$ | 1,100 | 2,100 | 1,260 | 230 | 0.41 | ---------- |
| $Cd_{0.05}Pb_{0.95}Zr_{0.53}Ti_{0.47}O_3$ | 1,100 | 2,100 | 1,119 | 215 | -------- | 7.84 |
| $Cd_{0.10}Pb_{0.95}Zr_{0.53}$ | 1,100 | 2,300 | 700 | 50 | -------- | ---------- |

[1] Not hot pressed.

While the examples shown in Table II have been selected from compositions wherein the zirconium to titanium ratio is from 52:48 to 54:46, it will be readily appreciated that results of a similar type may be obtained utilizing compositions of much wider ratio of zirconium to titanium. These particular compositions of lead zirconate-lead titanate have been found to possess the most desirable properties based on previous investigations.

An examination of the data of Table II shows that a straight forward substitution of cadmium for lead occurs up to 5 molar percent. However, it is apparent that a separate phase exists when the cadmium content reaches 10 molar percent. Dielectric constant and $d_{33}$ have dropped sharply.

Polarization of samples used in obtaining the data of this specification was accomplished by applying electrodes to opposite surfaces of test samples, heating the samples to 160° C. in an oil bath, and applying an increasing D.C.

field across the sample until a rapid change in the passage of current was observed. At this point the field was removed and the samples were polarized.

As has been previously noted, the cadmium substituted lead zirconate-lead titanate compositions of the present invention may also be modified by the addition of small quantities of various oxides as taught by the previously referred to Kulcsar patent. In addition to these materials it is now possible to use antimony pentoxide as an additive in a similar manner. As illustrative of these additions three samples of cadmium substituted lead zirconate-lead titanate with various quantities of niobium and antimony were prepared in the manner previously described. The antimony or niobium was added to a batch of material having a composition as shown in Table III.

*Table III*

| $Cd_{0.015}Pb_{0.985}Zr_{0.53}Ti_{0.47}O_3$ | Relative dielectric constant K, 24 hours after poling | kp |
|---|---|---|
| Added 0.0123M $PbNb_2O_6$ | 1,580 | 0.54 |
| Added 0.0123M $PbSb_2O_6$ | 1,600 | 0.55 |
| Added 0.00615M $PbSb_2O_6$ | 1,550 | 0.51 |

Sufficient lead oxide (PbO) was added to the respective $Sb_2O_5$ or $Nb_2O_5$ to give the empirical composition indicated as added to the base mixture. This material was calcined at 1400° F. for 5 hours, cooled and regound to a powder, pressed into the desired shapes for test samples and fired without pressure at 2000° F. for 5 hours. Relative dielectric constant and planar couping coefficients of the final product were as shown. Density of the final products were lowered slightly by the addition of $Sb_2O_5$ or $Nb_2O_5$ over those densities obtained with the cadmium substituted lead zirconate-lead titanate—93.8% of theoreticals vs. about 98% of theoretical.

Variation of the amount of antimony or other oxides added to cadmium substituted lead zirconate-lead titanate will product results comparable to those shown in the strontium or calcium substituted materials of the referenced Kulcsar patent.

Having thus described my invention, I claim:

1. As a composition of matter, a solid solution consisting essentially of lead zirconate and lead titanate wherein the atomic ratio of Zr to Ti is from about 90:10 to 40:60 and cadmium, said cadmium being present as a substitutent for approximately 0.5 to 5.0 atomic percent for the lead in said solution.

2. As a composition of matter, a solid solution consisting essentially of lead zirconate and lead titanate wherein the atomic ratio of Zr to Ti is from 90:10 to 40:60 and cadmium, said cadminum being present as a substituent for about 1.5 to 2.5 atomic precent for the lead in said solution.

3. As a composition of matter, a solid solution consisting essentially of lead zirconate and lead titanate wherein the atomic ratio of Zr to Ti is from about 52:48 to about 54:46 and cadmium, said cadmium being present as a substituent for about 0.5 to about 5.0 atomic percent for the lead in said solution.

4. As a composition of matter a solid solution consisting essentially of lead zirconate-lead titanate wherein the atomic ratio of Zr to Ti is from about 53:47 cadmium, said cadmium being present as a substituent for about 1.5 atomic percent for the lead in said solution.

5. As a composition of matter, a solid solution consisting essentially of lead zirconate-lead titanate wherein the atomic ratio of Zr to Ti is from 90:10 to 40:60 and cadmium, said cadmium being present as a substituent for appromixately 0.5 to 5.0 atom percent of the lead in said solution, said solution further containing from about 0.1% up to about 5.0% weight percent on an oxide basis of a material selected from the group consisting of antimony, niobium, tantalum, and the rare earth oxides excluding cerium.

6. An electromechanical transducer comprising: an electrically polarized ceramic consisting essentially of a solid solution of lead zirconate-lead titanate wherein the atomic ratio of Zr to Ti is from 90:10 to 40:60 and cadmium, said cadmium being present as a substituent for approximately 0.5 to 5 atom percent for the lead in said solution.

References Cited by the Examiner

UNITED STATES PATENTS

| | | | |
|---|---|---|---|
| Re. 24,191 | 7/56 | Jaffe | 252—62.9 |
| 2,768,901 | 10/56 | Tombs | 103—39 |
| 2,911,370 | 11/59 | Kulcsar | 252—62.9 |

FOREIGN PATENTS

| | | |
|---|---|---|
| 574,577 | 1/56 | Great Britain. |

MAURICE A. BRINDISI, *Primary Examiner.*